(12) United States Patent
Roney et al.

(10) Patent No.: US 8,386,402 B2
(45) Date of Patent: Feb. 26, 2013

(54) METHODS, SYSTEMS, AND COMPUTER PROGRAM PRODUCTS FOR IDENTIFYING CYCLICAL BEHAVIORS

(75) Inventors: William N. Roney, Loganville, GA (US); Christopher P. Britton, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 521 days.

(21) Appl. No.: 12/641,797

(22) Filed: Dec. 18, 2009

(65) Prior Publication Data

US 2011/0154093 A1 Jun. 23, 2011

(51) Int. Cl.
*G06F 15/18* (2006.01)
(52) U.S. Cl. .......................................................... 706/12

(58) Field of Classification Search ..................... 706/12
See application file for complete search history.

(56) References Cited

U.S. PATENT DOCUMENTS

2010/0299287 A1* 11/2010 Cao et al. ........................ 706/12

* cited by examiner

*Primary Examiner* — Kakali Chaki
*Assistant Examiner* — Ababacar Seck
(74) *Attorney, Agent, or Firm* — Cantor Colburn LLP

(57) ABSTRACT

Methods, systems, and computer program products for identifying cyclical behaviors are provided. A method includes defining a time-based set of splines in an equation for a dataset, identifying a periodicity of a cycle derived from implementing the time-based set of splines on the dataset, and taking a responsive action as a result of identifying the periodicity of the cycle.

14 Claims, 3 Drawing Sheets

METHODS, SYSTEMS, AND COMPUTER PROGRAM PRODUCTS FOR IDENTIFYING CYCLICAL BEHAVIORS

BACKGROUND

The present invention relates generally to data analysis and, more particularly, to methods, systems, and computer program products for identifying cyclical behaviors.

In monitoring a large number of metrics that do not fit a steady state pattern, but instead fit a cyclical state, active monitoring may not effectively rely on existing techniques such as boundary alerting. Boundary alerting involves establishing pre-defined static values and using the pre-defined static values to establish a baseline of acceptable behavior. This may be implemented by defining alert rules specific to each metric after first determining what the norm is for the metric. However, such techniques are not practical with large amounts of data in which a method of establishing and alerting on deviation of trends is desired, as this would require very complex calculations and may introduce inaccuracies. As a result, a graphic display is often used with human interpretation. However, with considering large amounts of data, this can be a cumbersome and error prone approach.

What is needed, therefore, is way to efficiently identify and understand cyclical behaviors.

BRIEF SUMMARY

The above-stated shortcomings and disadvantages are overcome or alleviated by methods, systems, and computer program products for identifying cyclical behaviors.

An exemplary method for identifying cyclical behaviors includes defining a time-based set of splines in an equation for a dataset, identifying a periodicity of a cycle derived from implementing the time-based set of splines on the dataset, and taking a responsive action as a result of identifying the periodicity of the cycle.

An exemplary system for identifying cyclical behaviors includes a computer processor and an application executing on the computer processor. The application implements a method. The method includes defining a time-based set of splines in an equation for a dataset, identifying a periodicity of a cycle derived from implementing the time-based set of splines on the dataset, and taking a responsive action as a result of identifying the periodicity of the cycle.

An exemplary computer program product for identifying cyclical behaviors includes a storage medium encoded with computer-readable program code, which when executed by a computer, causes the computer to implement a method. The method includes defining a time-based set of splines in an equation for a dataset, identifying a periodicity of a cycle derived from implementing the time-based set of splines on the dataset, and taking a responsive action as a result of identifying the periodicity of the cycle.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

Exemplary embodiments include methods and systems for identifying cyclical behaviors with respect to a defined dataset. The cyclical behavior identification processes enables a time-based set of spline equations to be defined and implemented on a data set to determine any cyclical behaviors. In one exemplary embodiment, the processes use a scrolling time window to identify the periodicity of a cycle (e.g., weekly, monthly, quarterly, etc.) and then monitor and react to deviations from the cycle by comparing current measurements with the appropriate spline from the cycle.

In one exemplary embodiment, a relational database and set theory are used to parallel calculation of trend line components. Trend lines for a large number of metric groups can be efficiently calculated as well as their first and second derivatives. By forward loading the "current" value and evaluating the corresponding change to the trend line derivatives, the dissimilar metrics can be evaluated together to rapidly identify metrics that are changing from a norm. These features are described further herein.

Figure 1:
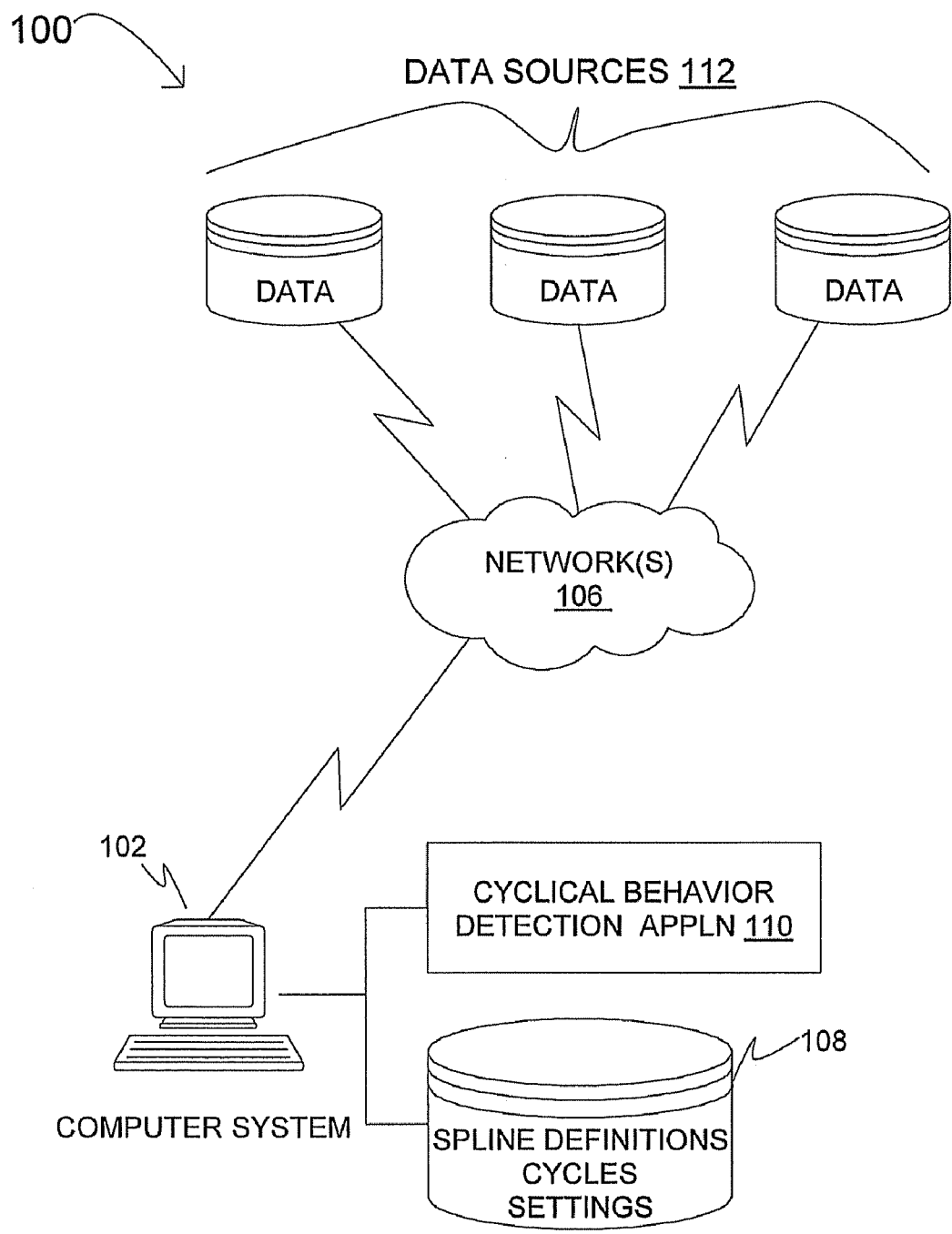
FIG. 1 is a block diagram of a system upon which identification of cyclical system behaviors may be implemented in exemplary embodiments.

Turning now to FIG. 1, a system upon which cyclical behavior identification processes may be implemented in exemplary embodiments will now be described. The system of FIG. 1 includes a computer system 102 in communication with data sources 112 over one or more network(s) 106. In an exemplary embodiment, the computer system 102 is implemented by an entity tasked with identifying cyclical system behaviors (e.g., for use in data monitoring and analysis for a number of data sources, such as data sources 112). Examples of the types of data subject to the cyclical behavior identification processes may include biometric data for patients in a health care environment, such as heart rate, blood pressure, and body temperature. Another example of the types of data may include meteorological data such as wind speed, air temperature, and atmospheric pressure. A further example may include computer or network performance data, such as processing speed, bandwidth capacity, and latency.

Computer system 102 may be implemented using one or more servers operating in response to a computer program stored in a storage medium accessible by the server(s). The computer system 102 may operate as a network server (e.g., a web server) to communicate with data sources 112 or other desired network entities. Alternatively, the computer system 102 may be implemented as a general-purpose computer (e.g., desktop, laptop, etc.). The computer system 102 handles sending and receiving information to and from data sources 112 and can perform associated tasks.

The computer system 102 executes one or more applications in support of the cyclical behavior identification processes. Such applications may include, e.g., a database management system (not shown) that coordinates access to various data sources and manages the data obtained therefrom. In an exemplary embodiment, the computer system 102 also executes one or more applications for facilitating the cyclical behavior identification processes. These one or more applications are collectively referred to herein as a cyclical behavior detection application 110. The cyclical behavior detection application 110 may be configured to automatically take one or more responsive actions upon detecting or identifying a cyclical behavior pattern with respect to a dataset. In one exemplary embodiment, a monitoring application (not shown) may be implemented by the computer system 102 in conjunction with the cyclical behavior detection application 110 for monitoring cyclical data patterns detected by the cyclical behavior detection application 110.

In exemplary embodiments, computer system 102 is in communication with a storage device 108. Storage device 108 may be implemented using memory contained in the computer system 102 or it may be a separate physical or virtual or logical device. As shown in FIG. 1, the storage device 108 is in direct communication with the computer system 102 (via, e.g., cabling). However, other network implementations may be utilized. For example, storage device 108 may be logically addressable as a consolidated data source across a distributed environment that includes one or more networks 106. Information stored in the storage device 108 may be retrieved and manipulated via the computer system 102. In an exemplary embodiment, storage device 108 may be configured to store data using relational databases through database management system structured query language (SQL) queries. Storage device 108 stores spline definitions, cycle periodicities, configurable responsive actions, as well as other related information, as described further herein.

As indicated above, the computer system 102 is also in communication with data sources 112. The data sources 112 may include independent sources of information stored in separately located data repositories that are accessed by the cyclical behavior identification processes. Data sources 112 may be may be implemented using memory contained in physical or virtual or logical devices that are distinct from the storage device 108. For example, data sources 112 may each be logically addressable as a consolidated data source across a distributed environment that includes one or more networks 106. Information stored in the data sources 112 may be retrieved and manipulated via the computer system 102. Operators of computer system 102 request and receive information provided via the cyclical behavior identification processes.

Network(s) 106 may include any type of known networks including, but not limited to, a wide area network (WAN), a local area network (LAN), a global network (e.g. Internet), a virtual private network (VPN), and an intranet. The network(s) 106 may be implemented using wireless networks (WiFi, satellite, cellular, etc.) or any kind of physical network implementation known in the art.

Figure 2:
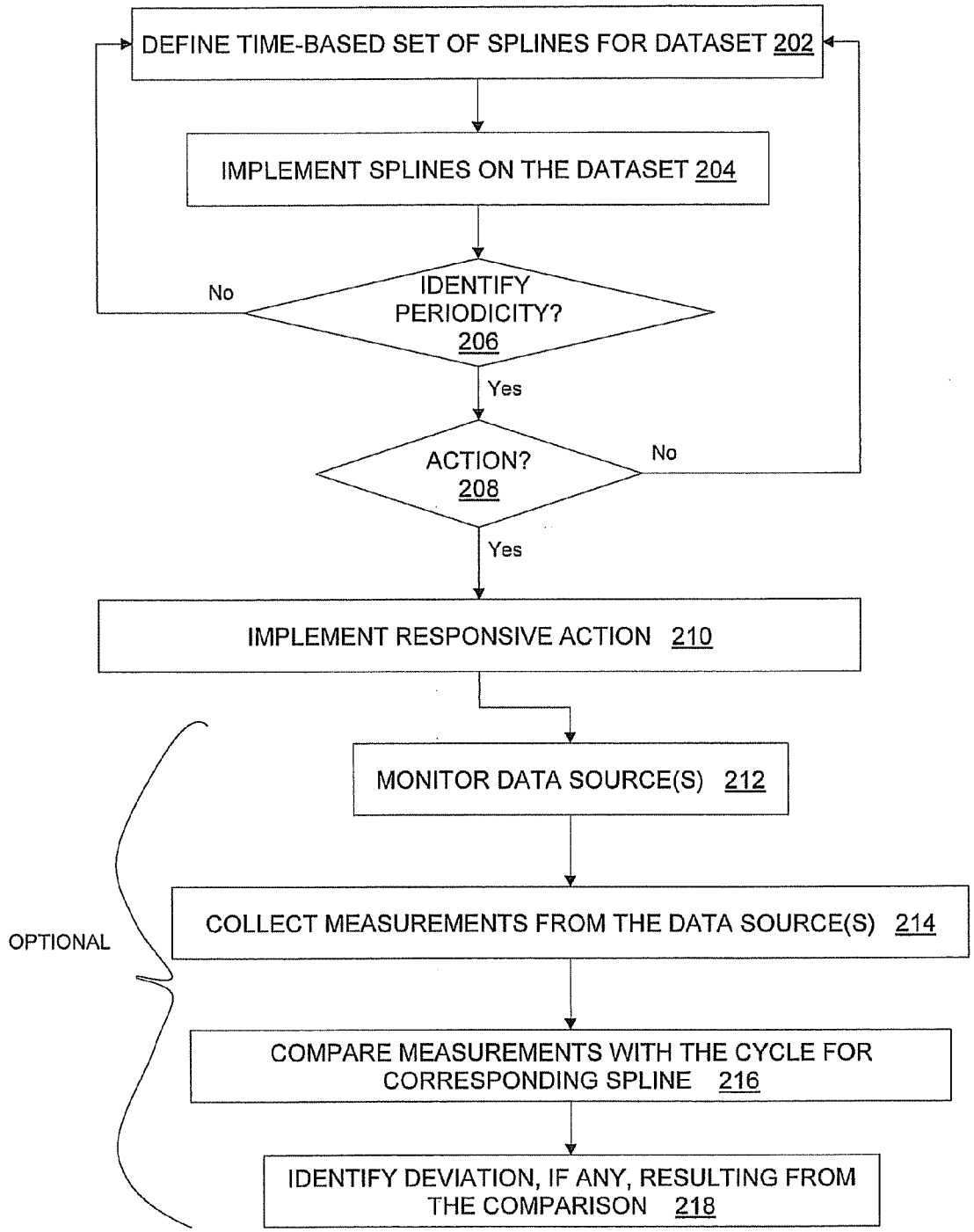
FIG. 2 is a flow diagram describing a process for identifying cyclical system behaviors in exemplary embodiments.
Figure 3:
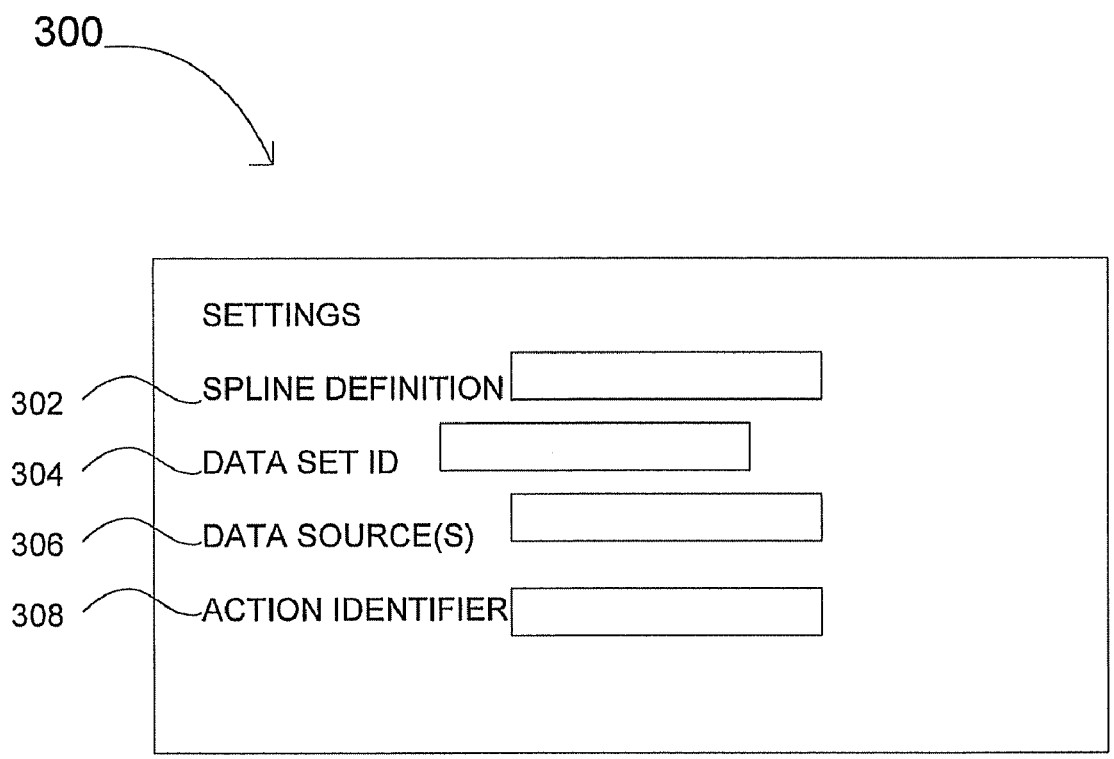
FIG. 3 is a user interface screen provided by the system of FIG. 1 in exemplary embodiments.

FIG. 2 is a flow diagram describing an exemplary process for implementing the cyclical behavior identification processes, and FIG. 3 depicts a user interface screen 300 of the cyclical behavior detection application 110. Turning now to FIGS. 2 and 3, an exemplary process and user interface for implementing the cyclical behavior identification processes will now be described.

The cyclical behavior detection application 110 user interface screen 300 is presented to a user of the services, e.g., via the computer system 102. The user is prompted via the user interface screen 300 to enter various settings at step 202. As shown in FIG. 3, e.g., settings may include a spline definition field 302, a data set identifier field 304, a data source(s) field 306, and an action identification field 308. In an exemplary embodiment, the spline definition field 302 may be configured to enable a user to defining a set of splines using an N=3 degree polynomial equation. The data set identifier field 304 identifies (e.g., via storage location) the data to which the splines are applied. For example, in a medical environment, the data set may include biometric data captured through a medical device. Alternatively, in a computer environment, the data set may include performance data captured from one or more computer processor units (CPUs). The data source(s) field 306 indicates the identity of the data sources (e.g., sources 112) that are subject to the data collection. The action identification field 308 may be used to define various actions to be taken by the system in response to detection of a particular cyclical pattern.

Once these settings are provided, the cyclical behavior detection application 110 implements the splines on the data set provided in the data set identifier field 304 of user interface screen 300 at step 204. The data sets may be sampled across multiple data sources and/or across multiple data partitions for a data source. These parameters may be defined via the data set identification field 304 and/or the data source(s) field 306. At step 206, the cyclical behavior detection application 110 uses the processed data set from step 204 to determine if a periodicity cycle has been identified. The periodicity of the cycle may be some identified pattern in the dataset that occurs over a period of hours, days, weeks, etc.

If no periodicity cycle is determined, the process returns to step 202, whereby the time-based set of splines may be re-defined. Otherwise, if a periodicity cycle has been identified at step 206, the cyclical behavior detection application 110 determines if a responsive action should be taken at step 208. The responsive action may be configured via the action identification field 308 of user interface screen 300. If a responsive action has been configured for the periodicity cycle at step 208, the responsive action is implemented by the cyclical behavior detection application 110. For example, in a financial trading environment, a periodicity cycle may be identified for buy/sell behavior with respect to commodities. A responsive action may include automatically initiating a purchase or sale of a commodity based upon the periodicity cycle pattern established. A responsive action may alternatively include generating a notification alert to a designated entity. If no responsive action is configured for the periodicity cycle at step 208, the process may return to step 202, whereby additional time-based sets of splines may be defined for the same or different data sets.

In an alternative exemplary embodiment, a determination that no periodicity cycle has been identified (step 206) may be useful as well. For example, suppose in a foreign currency exchange market where there is a constant search for arbitrage opportunities involving a multi-currency trade where exchange rates are incorrectly set, a bank may implement this check to verify that their exchange rates are not following into a cycle that would expose them to loss as a result of arbitrage. In this embodiment, a non-deviation (or lack of cycle) may trigger a responsive action.

In alternative exemplary embodiments, the identified cyclical behavior patterns may be used to monitor current and future data acquired, e.g., via data sources 112. At step 212, the cyclical behavior detection application 110 uses the cycle to monitor incoming data from one or more data sources to identify a current, real-time monitored value. The cyclical behavior detection application 110 collects measurements from the monitoring at step 214. At step 216, the cyclical behavior detection application 110 compares the measurements collected with a corresponding spline (i.e., one of the time-based spline sets), and identifies deviations from the cycle, if any, at step 218. The corresponding spline refers to the spline in the time-based set of splines which has a time metric that coincides with the periodicity of the cycle. For example, if there are three time-based splines (one based upon hours, the second based upon days, and the third based upon weeks), and the periodicity cycle is in weeks, then the third spline would be used in the comparisons performed in step 216.

The deviation may be handled in a manner similar to responsive action taken in step 208. For example, one or more corrective actions may be taken in response to the deviation. In one embodiment, the corrective action may be reallocating resources based upon the cycle in order to minimize the deviation (e.g., in a network monitoring system, various processors may be reallocated from performing their usual tasks to handle an increase volume in network transactions identified for a particular time).

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The exemplary embodiments can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for identifying cyclical behaviors, comprising:
   defining a time-based set of splines in an equation for a dataset;
   identifying, via an application executing on a computer processor, a periodicity of a cycle derived from implementing the time-based set of splines on the dataset;
   taking a responsive action as a result of identifying the periodicity of the cycle;
   monitoring, via the application, a data source and collecting measurements responsive to the monitoring;
   identifying one of the set of splines as a selected spline corresponding with the cycle based on a time metric defined for each of the splines;
   identifying, via the application, any deviation from the periodicity of the cycle by comparing the measurements with the selected spline; and
   implementing a corrective action in response to the deviation.

2. The method of claim 1, the time-based set of splines is defined using an N=3 degree polynomial.

3. The method of claim 1, wherein the corrective action includes reallocating resources to minimize the deviation.

4. The method of claim 1, further comprising generating an alert in response to the deviation.

5. The method of claim 1, wherein the dataset is sampled from multiple data sources.

6. A system for identifying cyclical behaviors, comprising:
   a computer processor; and
   an application executing on the computer processor, the application implementing a method, the method comprising:
   defining a time-based set of splines in an equation for a dataset;
   identifying a periodicity of a cycle derived from implementing the time-based set of splines on the dataset; and
   taking a responsive action as a result of identifying the periodicity of the cycle;
   monitoring, via the application, a data source and collecting measurements responsive to the monitoring;
   identifying one of the set of splines as corresponding with the cycle based on a time metric defined for each of the splines;
   identifying, via the application, any deviation from the periodicity of the cycle by comparing the measurements with a corresponding spline; and
   implementing a corrective action in response to the deviation.

7. The system of claim 6, the time-based set of splines is defined using an N=3 degree polynomial.

8. The system of claim 6, wherein the corrective action includes reallocating resources to minimize the deviation.

9. The system of claim 6, wherein the application further performs:
   generating an alert in response to the deviation.

10. A computer program product for identifying cyclical behaviors, the computer program product comprising a non-transitory storage medium having computer-readable program code embodied thereon, which when executed by a computer, causes the computer to implement a method, the method comprising:
    defining a time-based set of splines in an equation for a dataset;
    identifying a periodicity of a cycle derived from implementing the time-based set of splines on the dataset; and
    taking a responsive action as a result of identifying the periodicity of the cycle;
    monitoring, via the application a data source and collecting measurements responsive to the monitoring
    identifying one of the set of splines as corresponding with the cycle based on a time metric defined for each of the splines;
    identifying, via the application, any deviation from the periodicity of the cycle by comparing the measurements with a corresponding spline; and
    implementing a corrective action in response to the deviation.

11. The computer program product of claim 10, the time-based set of splines is defined using an N=3 degree polynomial.

12. The computer program product of claim 10, wherein the corrective action includes reallocating resources to minimize the deviation.

13. The computer program product of claim 10, wherein the program code further implements:
    generating an alert in response to the deviation.

14. The computer program product of claim 10, wherein the dataset is sampled from multiple data sources.

* * * * *